Nov. 24, 1970   B. H. KLYCE   3,543,259
CAPACITIVE PICK-UP SYSTEM FOR REMOTE UTILITY METER READING
Filed Jan. 4, 1968
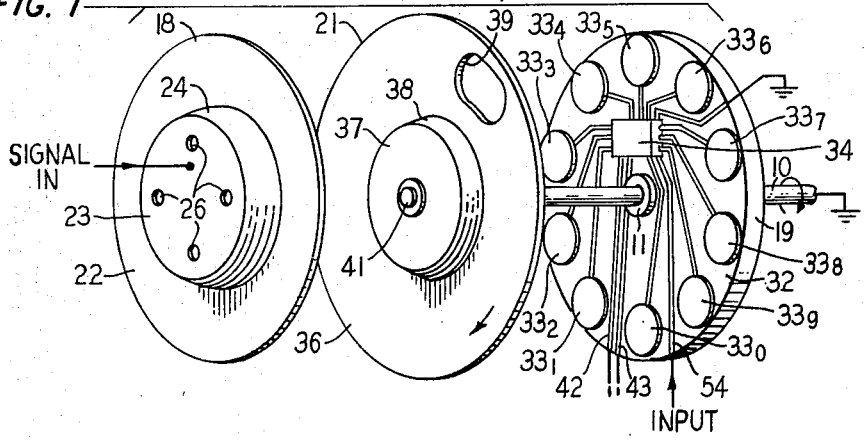
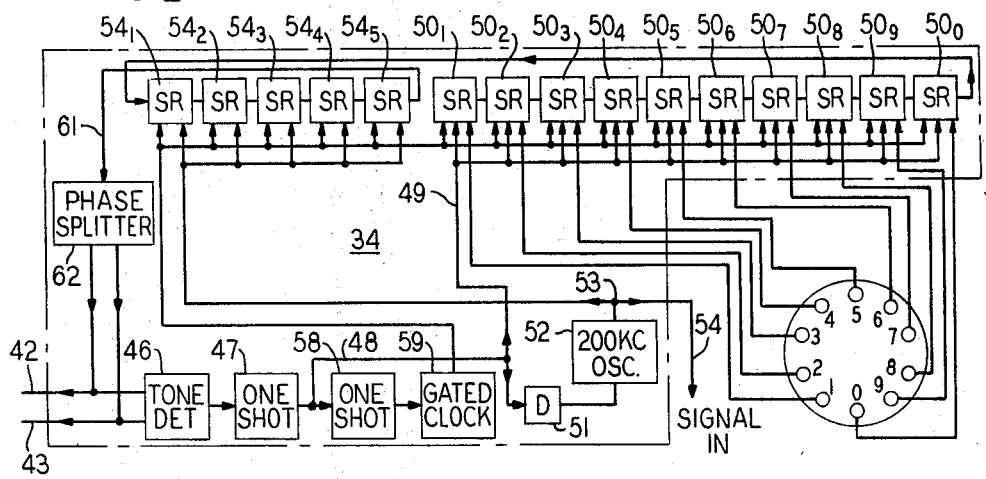
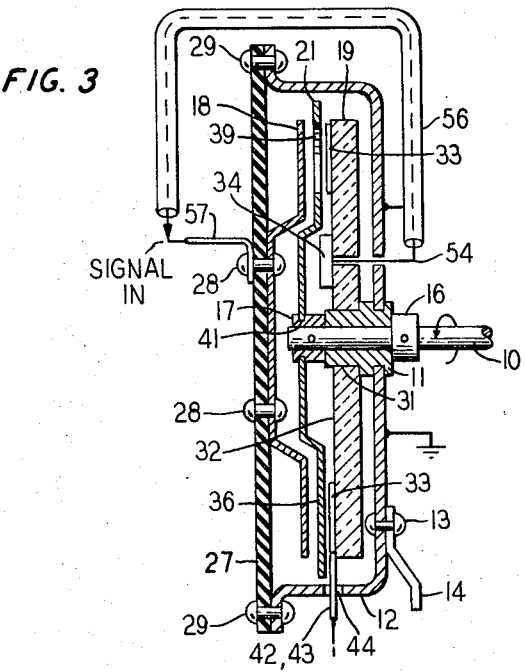
INVENTOR
B. H. KLYCE
BY
ATTORNEY United States Patent Office 3,543,259
Patented Nov. 24, 1970

3,543,259
CAPACITIVE PICK-UP SYSTEM FOR REMOTE UTILITY METER READING
Battle H. Klyce, Stamford, Conn., assignor to Bell Telephone Laboratories, Incorporated, Murray Hill, N.J., a corporation of New York
Filed Jan. 4, 1968, Ser. No. 695,596
Int. Cl. G08c *19/10*
U.S. Cl. 340—200                   8 Claims

ABSTRACT OF THE DISCLOSURE

A device for capacitively coupling a signal to one of a plurality of pick-up leads to indicate the angular position of a shaft in which a grounded conductive sheet having an aperture therethrough is rotated by the shaft shielding all but one of the pick-up leads from the signal.

FIELD OF THE INVENTION

This invention relates to a system for reading utility meters from a central location by means of a telephone network and particulraly to an improved capacitive transducer for providing a signal indicative of a meter reading.

DESCRIPTION OF THE PRIOR ART

The desire to read utility meters automatically over the telephone network and to report the readings to a central data collection center has existed for many years. In a few isolated cases remote reading of meters is an accomplished fact. An economical system suitable for widespread residential use, however, has thus far eluded the industry.

To be commercially acceptable for residential utility meter reading an automated system should employ a minimum of equipment at each meter location. The transducer for converting meter readings to electrical signals should minimize frictional drag on the meter movement. To further reduce cost, especially the cost of initially installing such a system, the bulk of the existing utility meters should be integrated into the system.

One system meeting many of these requirements is disclosed in a patent application of Bonyhard, Seidel and Shapiro, Ser. No. 599,487, filed Dec. 6, 1966. This system employs a shift register having one stage designated for each of a plurality of discrete dial positions on a meter to be read. Dial position information is inserted into a predetremined one of the stages for each dial to be read upon command from a central office location. The information is then serially shifted out of the shift register providing pulses spaced in time in accordance with the indication of the meter.

Various implementations of the shift register system are conceivable. The embodiment disclosed in the Bonyhard et al. application employs a domain wall shift register wound around meter dials and a magnetic pointer on the meter. This implementation is simple and straightforward. Presently, however, the domain wall wire is not being produced in sufficient quantities to make this approach economically attractive.

The advantages of the shift register read-out can be enjoyed by employing an electronic shift register circuit. Such a circuit could be driven through a capacitive pick-up transducer as disclosed in U.S. Pat. 3,072,894, entitled "Telemetering System," which issued to D. M. Chapin on June 18, 1962. It has been found, however, that such capacitive pick-up transducers tend to provide signals of varying levels at all the designated dial positions. To determine the actual dial position, signal level detectors are necessary at each shift register stage input. The level detector circuits add to the cost of the equipment at each utility meter thereby greatly increasing the overall sysem cost.

BRIEF DESCRIPTION OF THE INVENTION

In the present invention an electrically grounded conductive sheet having an aperture therethrough is movably mounted to selectively shield electrically contacts spaced to a first side thereof from a source of electromagnetic radiation incident upon second side thereof. A pattern of signals appears on the electrical contacts indicating the position of the conductive sheet.

In an embodimet for remote reading of a utility meter, each electrical contact is connected to an input lead of a shift register stage. The source of electromagnetic radiation is selectively actuated to transfer the pattern of signals to the shift register. A plurality of additional shift register stages are preset by each actuation of the source of eletcromagnetic radiation to provide predetermined code preceding the pattern of signals to verify the identiy of the meter being read.

In an embodiment for remote reading of a utility meter having a plurality of dials, one device having an electrically grounded conductive sheet with an aperture therethrough is associated with each dial. The shift register stages associated with the respective contacts are electrically arranged in series with each other and may include stages for predetermined coding preceding the stages associated with each dial.

DESCRIPTION OF THE DRAWING

FIG. 1 shows an exploded isometric view of a capacitive pick-up device embodying the principles of this invention;

FIG. 2 is a block diagram of a system exhibiting features of this invention for utility meter reading employing the capacitive pick-up device of the invention; and FIG. 3 is a detailed sectional view of a capacitive pick-up device constructed in accordance with the teachings of this invention.

DETAILED DESCRIPTION

Referring now to FIGS. 1 and 3, we see an end portion of an electrically conductive shaft 10 extending from a utility meter, not shown. The end portion of the shaft 10 is guided in rotary motion by an electrically conductive bearing 11. The bearing 11 is held in position, as shown in FIG. 3, by an electrically conductive bearing support bracket 12. The bracket 12 is held stationary by a rivet 13 securing the bracket 12 to an insulating member 14 secured to the meter housing. A pair of pinned collars 16 and 17 are provided to limit the axial motion of the shaft 10. It should be understood that the shaft 10, the bearings 11, the bracket 12, the rivets 13, the insulating member 14 and the collars 16 and 17 may all be part of an existing utility meters.

In accordance with this invention, a capacitive pick-up device for providing a signal related to the relative angular position of the shaft 10 is formed from two stationary plates 18 and 19 and a plate 21 mounted on the collar 17 of the shaft 10 for rotation therewith. The plates 18, 19, and 21 are shown in FIG. 1 in isometric form to show details thereof and illustrate the spatial relationships therebetween.

The stationary plate 18, made from a conductive material, includes an annular lip portion 22 lying in a plane parallel to and connected with a circular center portion 23 by a truncated conical section 24. The circular center portion 23 has four locating holes 26 therethrough for securing the plate 18 to an insulating member 27, as shown in FIG. 3. Rivets 28 may be employed for securing the plate 18 to the insulating portion 27 while rivets 29 may secure the member 27 to the bracket 12.

The stationary plate 19, made from an insulating material has a center bore 31 therethrough for force-fit mounting on the bearing 11. On a surface 32 of the plate 19 and mounted to face the stationary plate 18 are a plurality of equiangularly disposed conducting buttons $33_0$ through $33_9$. Each button is connected by wiring to an integrated circuit 34 shown in block diagram form in FIG. 2.

The plate 21, made from a conducting material, has an annular lip portion 36 lying in a plane parallel to, and connected with a central circular portion 37 by a truncated conical section 38. The annular lip portion 36 has an opening 39 therethrough which is generally oval in shape. A central circular portion 37 has a centrally located opening which mates with a circumferential groove 41 securing the plate 21 to the collar 17. It is seen that with the plate 21, the collar 17, the shaft 10, the bushing 31 and the bracket 12 all in contact and all made from conducting materials, a low impedance path is established between the plate 21 and the bracket 12. In operation, the bracket 12 is grounded, rendering the plate 21 a shielding disc having an aperture 39 therethrough interposed between the two stationary plates 18 and 19.

Referring now to FIG. 2, we see a block diagram of the circuitry on the integrated circuit 34. A pair of leads 42 and 43 printed on the insulating plate 19, as shown in FIG. 1, extends through a hole 44 in the bracket 12, as shown in FIG. 3, to connect the integrated circuit 34 to a telephone line. At the integrated circuit 34, as shown in FIG. 2, the leads 42 and 43 are connected to provide input signals to a tone detector 46.

When it is desired to sense the relative position of the shaft 10, a suitable tone is transmitted from a telephone central office to leads 42 and 43 actuating the tone detector 46 to provide an input pulse to a one-shot multivibrator 47. The one-shot 47 provides a pulse which is applied over leads 48 and 49 to reset to their zero conditions ten serially connected shift register stages $50_0$ through $50_9$. Each of the stages $50_0$ through $50_9$ has a set input lead connected to one of the conducting buttons $33_0$ through $33_9$, respectively. The lead 48 also applies the output pulse from the one-shot 47 to a delay circuit 51 to actuate an oscillator 52 for providing a tone such as 200 kHz. on an output terminal 53. The 200 kHz. tone is applied to either set or reset inputs (designated S and R respectively) of the remaining shift register stages $54_1$ through $54_5$, serially connected with the shift register stages $50_0$ through $50_9$. The applied tone thus presets the stages $54_1$ through $54_5$ to a predetermined pattern of 1's and 0's. In this way, a start code and a meter identification code may be included with meter reading information to facilitate well-known bookkeeping operations of associated equipment.

The signal on the output terminal 53 is fed out of the integrated circuit 34 to lead 54. This signal could be brought out of the integrated circuit and away from plate 19 on a printed wire shielded by two immediately adjacent grounded printed wires to reduce the signal reaching the buttons $33_0$ through $33_9$. In this case, however, the lead 54 is brought out through the back of the integrated circuit 34 perpendicular to and through the plate 19 and the bracket 12 to minimize the stray fields reaching the buttons $33_0$ through $33_9$. The lead 54 is connected to a shielded grounded wire 56 to bring the signal to a binding post 57 electrically connected through rivet 28 to the plate 18. The burst of the 200 kHz. signal on the plate 18 sets up electromagnetic fields at this frequency to the left-hand side of the plate 21. The grounded plate 21 acts as a sink for these fields except in the area of the aperture 39. The field passing through aperture 39 impresses a field on a button or buttons $33_0$ through $33_9$ which are directly adjacent this aperture 39. The actuation of two adjacent buttons indicates that the aperture 39 lies between two button positions. The particular button or buttons $33_0$ through $33_9$, which are excited at a given instant, actuate the set input of the associated shift register stages $50_1$ through $50_0$, thereby setting up a pattern of 1's and 0's in the shift register stages $50_1$ through $50_0$ indicative in binary coded decimal form of the relative position of the aperture in the plate 39 with respect to the plate 19.

The trailing edge of the pulse from the one-shot 47 triggers the second one-shot 58 to provide an enabling pulse for a gated clock 59. The gated clock 59 provides a train of pulses equal in number at least to the total number of shift register stages in series. These shifting pulses are applied to shifting inputs of each of the shift register stages stepping the information along. A signal is taken by lead 61 from the output of the shift register stage $54_5$ to provide a coded signal followed by the angular information position signal contained in the shift register stages $50_1$ through $50_0$. This signal is fed to a phase splitter 62 providing a differential signal to be conducted by leads 42 and 43 back to the central office for future processing. By prewiring, and therefore presetting, the coded information each time the meter is read, the one-shot 58 need not be accurately timed to prevent excess pulses from the gated clock 59.

It is to be understood that the above-described embodiments are simply illustrative of a particular application of the principles of the invention and many other modifications may be made without departing from the spirit and scope of the invention.

What is claimed is:
1. In combination:
    a conductive plate having an aperture therethrough from a first side to a second side;
    means for movably mounting said conductive plate, said aperture traversing a predetermined path upon motion of said conductive plate;
    a plurality of conductive elements;
    means for mounting said plurality of conductive elements spaced apart and adjacent said predetermined path on said first side of said conductive plate; and
    a conductive member mounted opposite to said second side of said conductive plate.

2. The combination as defined in claim 1 in which an insulating plate mounted in parallel spatial relationship to said conductive plate serves as said means for mounting said plurality of spaced apart conductive elements.

3. The combination as defined in claim 2 in which a rotatably mounted shaft extending through said insulating plate serves as said means for movably mounting said conductive plate.

4. The combination as defined in claim 3 in which said conductive member is mounted in parallel spatial relationship to said conductive plate.

5. The combination as defined in claim 1 also including means for grounding said conductive plate and means for applying an alternating-current signal to said conductive member.

6. In combination:
    a conductive plate having an aperture therethrough from a first side to a second side;
    means for movably mounting said conductive plate, said aperture traversing a predetermined path upon motion of said conductive plate;
    a plurality of conductive elements;
    means for mounting said plurality of conductive elements spaced apart and adjacent said predetermined path on said first side of said conductive plate;
    a conductive member mounted opposite to said second side of said conductive plate;
    means for grounding said conductive plate and means for applying an alternating-current signal to said conductive member;
    a plural stage shift register having at least one stage per each of said spaced apart conductive elements; and means for connecting each of said spaced apart conductice elements to one of said shift register stages.

7. In combination:
a conductive plate having an aperture therethrough from a first side to a second side;
means for movably said conductive plate, said aperture traversing a predetermined path upon motion of said conductive plate;
a plurality of conductive elements;
means for mounting said plurality of conductive elements spaced apart and adjacent said predetermined path on said first side of said conductive plate;
a conductive member mounted opposite to said second side of said conductive plate;
means for grounding said conductive plate; and means for applying an alternating-current signal to said conductive member;
a plural stage shift register having more than one stage for each of said spaced apart conductive elements;
means for connecting each of said spaced apart conductive elements to one of said shift register stages leaving a number of unconnected stages; and
means for applying said alternating-current signal to said unconnected stages.

8. The combination as defined in claim 7 in which:
an insulating plate serves as said means for mounting said plurality of spaced apart conductive elements; and
said shift register is one integrated circuit mounted on said insulating plate.

References Cited
UNITED STATES PATENTS 2,527,215    10/1950    Hahn _____ 340—200

THOMAS B. HABECKER, Primary Examiner

U.S. Cl. X.R.

340—183